US008271483B2

(12) United States Patent
Staddon et al.

(10) Patent No.: US 8,271,483 B2
(45) Date of Patent: Sep. 18, 2012

(54) METHOD AND APPARATUS FOR DETECTING SENSITIVE CONTENT IN A DOCUMENT

(75) Inventors: Jessica N. Staddon, Redwood City, CA (US); Richard Chow, Sunnyvale, CA (US); Valeria de Paiva, Cupertino, CA (US); Philippe J. P. Golle, San Francisco, CA (US); Ji Fang, Mountain View, CA (US); Tracy Holloway King, Mountain View, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 611 days.

(21) Appl. No.: 12/208,091

(22) Filed: Sep. 10, 2008

(65) Prior Publication Data
US 2010/0076957 A1 Mar. 25, 2010

(51) Int. Cl.
G06F 17/30 (2006.01)
(52) U.S. Cl. ........ 707/730; 707/706; 707/707; 707/727; 707/728; 707/736
(58) Field of Classification Search .................. 707/706, 707/709, 730, 736, 707, 727, 728
See application file for complete search history.

(56) References Cited

U.S. PATENT DOCUMENTS

| | | | | |
|---|---|---|---|---|
| 7,155,668 B2 * | 12/2006 | Holland et al. | ............... | 715/256 |
| 2002/0016794 A1 * | 2/2002 | Keith, Jr. | ........................ | 707/201 |
| 2003/0028558 A1 * | 2/2003 | Kawatani | ....................... | 707/500 |
| 2006/0080315 A1 * | 4/2006 | Mitchell | ............................ | 707/6 |
| 2008/0069450 A1 * | 3/2008 | Minami et al. | ................ | 382/199 |
| 2008/0140648 A1 * | 6/2008 | Song et al. | ......................... | 707/5 |
| 2008/0162514 A1 * | 7/2008 | Franks et al. | .................. | 707/100 |
| 2009/0240687 A1 * | 9/2009 | Eskebaek | ........................... | 707/5 |

* cited by examiner

Primary Examiner — Charles Kim
Assistant Examiner — Fatima Mina
(74) Attorney, Agent, or Firm — Shun Yao; Park, Vaughan, Fleming & Dowler LLP (57) ABSTRACT

One embodiment of the present invention provides a system that detects sensitive content in a document. In doing so, the system receives a document, identifies a set of terms in the document that are candidate sensitive terms, and generates a combination of terms based on the identified terms that is associated with a semantic meaning. Next, the system performs searches through a corpus based on the combination of terms and determines hit counts returned for each term in the combination and for the combination. The system then determines whether the combination of terms is sensitive based on the hit count for the combination and the hit counts for the individual terms in the combination, and generates a result that indicates portions of the document which contain sensitive combinations.

12 Claims, 7 Drawing Sheets

METHOD AND APPARATUS FOR DETECTING SENSITIVE CONTENT IN A DOCUMENT

BACKGROUND

1. Field of the Invention

The present invention relates to techniques for detecting sensitive content in a document. More specifically, the present invention relates to a method and apparatus for detecting sensitive content in a document based on results from an Internet search engine.

2. Related Art

Identifying sensitive content in a document can be an arduous task. Content managers are often responsible for analyzing the document to determine which portions are associated with sensitive information. In doing so, these content managers face the challenge of understanding the types of content in the document that are associated with a given sensitive topic, and the types of content associated with public information.

To make matters worse, content managers have few tools at their disposal for determining the sensitivity of content. The tools currently in existence tend to require a significant amount of training data and user input in order to recognize sensitive topics. Content managers often do not have sufficient training data to make use of these tools. Therefore, identifying sensitive content in a document often involves laborious and error-prone human review.

SUMMARY

One embodiment of the present invention provides a system that detects sensitive content in a document. In doing so, the system receives a document, identifies a set of terms in the document that are candidate sensitive terms, and generates a combination of terms based on the identified terms that is associated with a semantic meaning. Next, the system performs searches through a corpus based on the combination of terms and determines hit counts returned for each term in the combination and for the combination. The system then determines whether the combination of terms is sensitive based on the hit count for the combination and the hit counts for the individual terms in the combination, and generates a result that indicates portions of the document which contain sensitive combinations.

In a variation on this embodiment, the system identifies the set of terms in the document that are candidate sensitive terms by processing the document with a part-of-speech (POS) tagger to identify words that belong to a predetermined set of word classes.

In a variation on this embodiment, the system determines the relationship between the identified terms by processing the document with a syntactic parser to determine relationships between the terms.

In a further variation, the system scores a respective relationship based on a determined relevance to the document and a likelihood of being sensitive.

In a variation on this embodiment, the system determines whether the combination of terms is sensitive by determining a number, $q_i$, of public documents that include a respective term $T_i$ in the combination of k terms. Then, the system computes an occurrence ratio, r, as the ratio between a predetermined function, $f$, of the terms $T_i$, and a predetermined function, g, of $q_i$:

$$r = \frac{f(T_1, T_2, \ldots, T_k)}{g(q_1, q_2, \ldots, q_k)}.$$

In a further variation, the predetermined function $f$ of $T_i$ evaluates to a number, n, of public documents that include the respective combination of k terms:

$$f(T_1, T_2, \ldots, T_k) = n.$$

In a further variation, the predetermined function g of $q_i$ is the average of the individual values for $q_i$:

$$g = \frac{\sum_{i=1}^{k} q_i}{k}.$$

In a variation on this embodiment, the system disregards the combination if the combination is not associated with sensitive information by determining that the respective combination can be inferred from public information.

In a further variation, the system determines that the combination can be inferred from public information by gathering supplemental information related to a respective term in the combination based on corpus searches and/or synonym/hypernym databases. In doing so, the system determines a degree of separation between two terms in the combination by determining the relationship between a first term in the combination and the supplemental information associated with a second term in the combination. Then, the system determines whether the degree of separation between the two terms in the combination is below a predetermined threshold.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

Embodiments of the present invention provide a sensitive content detection system that performs a combination of natural language processing and data mining to identify sensitive content in a document. This system is based on the premise that prominent information on the Internet is unlikely to be sensitive. The prominence of content on the Internet is an indication that it is known to many people, and can be easily discovered by others through a search engine. Consequently, this prominent information can no longer be considered private and sensitive. Note that, while sensitive content is expected to not be found easily on the Internet, lack of Internet representation is not a sufficient condition for sensitivity. Furthermore, the sensitive content detection system describe herein can perform searches through a corpus of various forms to determine what is sensitive content. In some embodiments, the corpus comprises of the Internet, while in some other embodiments, the corpus can comprise of a local database or any other collection of knowledge. The remainder of this disclosure makes reference to the Internet as an exemplary corpus.

The sensitive content detection system described herein is most appropriate for identifying sensitive content that establishes a previously unknown link between a number of terms or attributes that are of independent interest. Hence, this system aims to detect new topics, but with the additional restriction that these topics appear "interesting" enough to be potentially sensitive. The following paragraphs present a number of example applications to further illustrate the utility of a sensitive content detection system.

Example

Watergate Informant

On May 31, 2005, former Deputy Director of the FBI, William Felt, revealed himself to be the "Deep Throat" informant who leaked information regarding the Nixon administration's involvement in the first Watergate break-in. In 2005, a document linking Felt and Watergate could likely have been automatically determined to be sensitive by noting the large number of Internet documents at that time pertaining to each of Watergate and William Felt, in contrast to the small number of documents pertaining to both William Felt and Watergate. The level of Internet presence for these terms is also reflected by the discussion group posts made searchable by Google via Google Groups. The number of posts including the term "Watergate" in the period between Jan. 1, 1981, and May 30, 2004, is 148,000, and the number of posts containing the keywords "William Felt" during this period is 24,800. However, the number of posts during the same 23-year period containing both "Watergate" and "William Felt" is merely 495. In contrast, in the two years and ten months following the disclosure, there have already been 1,300 posts mentioning the keywords "Watergate William Felt."

Example

Microsoft-Yahoo! Merger

On May 4, 2007, Microsoft's interest in acquiring Yahoo! became public knowledge. Prior to this date, a document pertaining to the proposed merger could have been automatically detected to be sensitive by noting the large number of Internet documents mentioning each of Microsoft and Yahoo!, in comparison to the relatively small number of Internet documents mentioning both companies. A similarly dramatic contrast can be found in Google Groups posts. There were 11,700,000 posts mentioning the keyword "Yahoo" during the period between Jan. 1, 1981, and May 3, 2007, and there were 11,900,000 posts containing the keyword "Microsoft" during this period. However, the number of posts during the same period containing both keywords is a mere 420. In contrast, the number of posts mentioning both keywords for the post-announcement period between May 4, 2007, and Mar. 18, 2008, is 21,600.

Example

Google Leak

In March of 2006, Google accidentally made public a PowerPoint presentation with sensitive content in the comments field of the slides. The content was sensitive because it projected revenue from online advertising in future quarters, and included sensitive text stating "AdSense margins will be squeezed." As a result, Google filed paperwork with the SEC, and promptly removed the PowerPoint file from their Internet site to replace it with an amended PDF file, because making this information public is at odds with SEC regulations. Prior to the accidental release of the PowerPoint file, public documents on the Internet could have been used to determine that this information is sensitive by noting the large number of Internet documents mentioning each of "AdSense" and "margin," in comparison to the relatively small number of Internet documents mentioning both terms. A similar trend can be found on Google Groups posts. There were 45,200 posts mentioning the term "AdSense" during the period between Jan. 1, 1981 and Mar. 1, 2006, and there were 1,580,000 posts containing "margin" during this period. However, the number of posts during the same period containing both terms is a mere 48. In contrast, the number of posts mentioning both terms in the two years and two months since the leak is 1,050, and the number of posts mentioning the term "AdSense" is 481,000.

Sensitive Content Detection System

Figure 1:
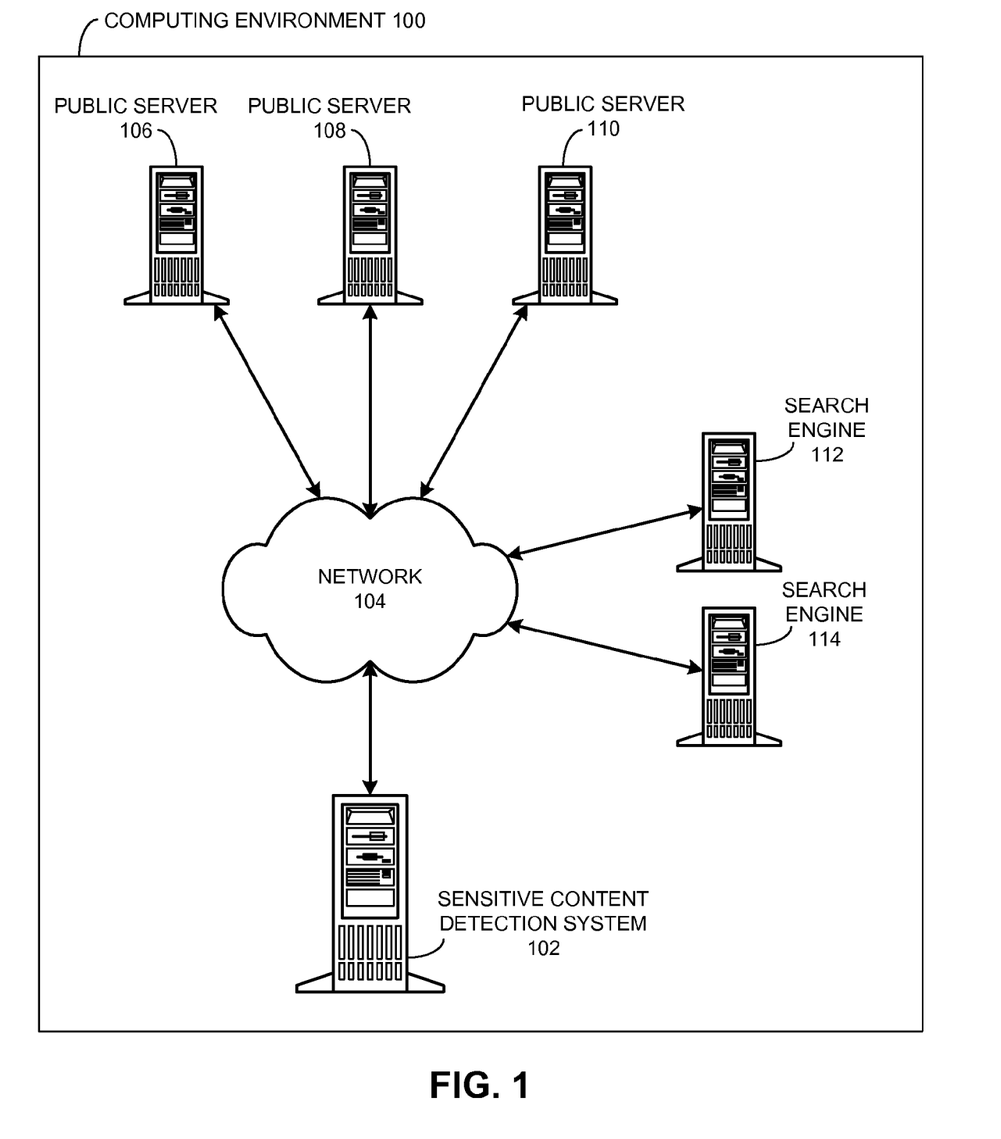
FIG. 1 illustrates an exemplary architecture for a computing environment associated with a sensitive content detection system in accordance with an embodiment of the present invention.

FIG. 1 illustrates an exemplary architecture for a computing environment 100 associated with a sensitive content detection system 102 in accordance with an embodiment of the present invention. Computing environment 100 includes a sensitive content detection system 102, a network 104, a number of public servers 106-110, and search engines 112-114. Network 104 can include any type of wired or wireless communication channel. In one embodiment of the present invention, network 104 includes the Internet. Public servers 106-110 can include any node with computational capability and a communication mechanism for communicating with search engines 112-114 through network 104. Public servers 106-110 post a number of files and documents on network 104 for public access. By doing so, public servers 106-110 allow search engines 112-114 to index the terms mentioned in their files and documents. Furthermore, public servers 106-110 can register a number of files and documents with search engines 112-114 to have their terms intentionally indexed by search engines 112-114.

Search engines 112-114 can include any node with computational capability and a communication mechanism for communicating with sensitive content detection system 102 and public servers 106-110 through network 104. In some embodiments of the present invention, search engines 112-114 include Internet search engines. Search engines 112-114 traverse a number of files and documents made publicly accessible by public servers 106-110 to index the terms mentioned within these files and documents. Search engines 112-114 use these indexes to catalog the contents of a multitude of documents. By doing so, search engines 112-114 are able to respond to a search query by providing a listing of documents (e.g., Internet sites, PDFs, etc.) that are associated with the terms in the search query.

Sensitive content detection system 102 can include any node with computational capability and a communication mechanism for communicating with search engines 112-114 through network 104. Sensitive content detection system 102 detects sensitive content within a given document by determining whether a respective combination of terms in the document is sensitive, and not merely information that may be novel, but not sensitive. In doing so, the system first groups the terms in the document into a number of combinations of related terms, and performs a search operation on search engines 112-114 for each term in the combination, and for the combination. Then, the system determines an occurrence ratio of the combination by computing a ratio between the number of hits returned for the combination of terms and the number of hits returned for the individual terms in the combination. If the occurrence ratio is below a predetermined threshold value, then the combination is determined to be associated with sensitive content. Otherwise, the combination is determined not to be associated with sensitive content.

Figure 2:
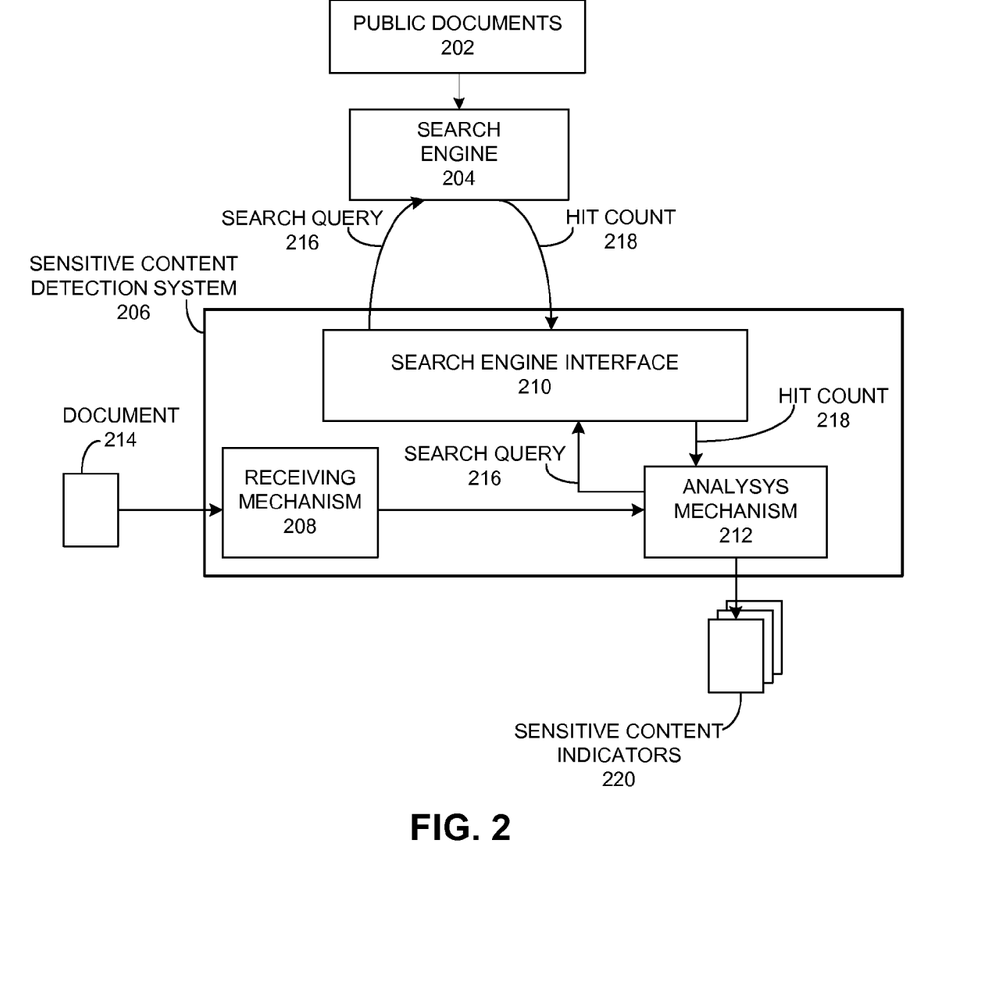
FIG. 2 illustrates a data flow associated with a sensitive content detection system in accordance with an embodiment of the present invention.

FIG. 2 illustrates a data flow associated with a sensitive content detection system 206 in accordance with an embodiment of the present invention. This data flow illustrates the flow of data within sensitive content detection system 206, and between sensitive content detection system 206 and a search engine 204. At one end of the illustration, search engine 204 crawls through a number of public documents 202 (e.g., Internet sites, PDFs, etc.), and parses the content of public documents 202 to index the terms they include. Search engine 204 uses these indexes to catalog the content of a multitude of public documents 202, and to respond to a search query 216 for a given term by providing a listing of public documents 202 that include the term in search query 216. Furthermore, search engines 204 can also respond to search query 216 for a given term by providing a hit count 218 that specifies the number of public documents 202 that include the term in search query 216.

Sensitive content detection system 206 includes a receiving mechanism 208 configured to receive a number of documents 214, a search engine interface 210 configured to communicate with search engine 204, and an analysis mechanism 212 configured to determine sensitive content within a given document 214. Sensitive content detection system 206 uses search engine 204 as a tool for computing an estimate on the level of Internet presence for individual terms from document 214, and for computing an estimate on the level of Internet presence for combinations of terms from document 214 which are associated with semantic meanings. The following paragraphs describe the functionality of analysis mechanism 212.

Analysis Mechanism

Analysis mechanism 212 performs a three-stage analysis on a given document. In the first stage, analysis mechanism 212 parses a document 214 to select a number of terms that may be associated with sensitive information, and to determine the relationships between these terms. Note that a term can include one or more words (e.g., a phrase). In the second stage, analysis mechanism 212 groups related terms into combinations, wherein a respective combination is associated with a sensitive topic. In the third stage, analysis mechanism 212 issues Internet searches based on the combinations of terms, and identifies the combinations that may be associated with sensitive content.

In the first stage, analysis mechanism 212 processes document 214 with a part-of-speech (POS) tagger to determine the types of words that are likely to be important for determining sensitivity. For example, analysis mechanism 212 may select adjectives and nouns, and parse document 214 with the POS tagger to determine the relationship between the selected words in document 214 (e.g., what noun a given adjective modifies). The POS parsing step can also include a scoring of the determined relationships as a metric of their perceived relevance to document 214 (in the case of text ambiguities) and their potential for sensitivity given the types of terms making up the relationships. During the parsing step, analysis mechanism 212 can tokenize and stem the text, and remove stop words. The result is a vector of terms that represent document 214, which includes the selected words, and includes POS information and relationship information.

In the second stage, analysis mechanism 212 leverages natural language processing (NLP) and other data mining techniques to cull the list of terms to sets of terms that are associated with a sensitive topic, and are likely to be sensitive (e.g., combinations of terms which generate few Internet search hits). Natural language processing is described in later paragraphs of this disclosure. In some embodiments of the present invention, analysis mechanism 212 builds a relationship graph to represent the relationships between terms in document 214. This relationship graph represents terms as graph nodes, and includes an edge between two nodes if an NLP operation indicates that they are related in document 214

(e.g., an adjective and the noun it modifies would be joined by an edge). In some embodiments of the present invention, NLP uses a semantic lexicon (e.g., the WordNet lexical database from Princeton University) to discover hypernyms that can assist in determining what is sensitive. A semantic lexicon is a dictionary of words labeled with semantic classes, which facilitates drawing associations between words. A hypernym of a given word is a word whose meaning denotes a superordinate or superclass of the given word. These hypernyms can be combined with user input information about what is sensitive content. For example, a semantic lexicon may classify something as a "medication," which is then likely to be sensitive when associated with a person. Equally important, a user might also specify non-sensitive associations (e.g., an association between a person and his/her alma mater). Such known non-sensitive associations can be used in conjunction with a semantic lexicon to ignore relationships that are unlikely to be sensitive.

In the third stage, analysis mechanism 212 identifies combinations of terms that have a likelihood of being sensitive. In one embodiment, analysis mechanism 212 uses an Internet search engine to search for combinations of terms that individually have high Internet presence, but together have low Internet presence. That is, an Internet search based on a search query with an individual term returns many hits, whereas an Internet search based on a combination of terms returns significantly fewer hits. To do so, analysis mechanism 212 performs Internet searches based on the combinations of terms, determines hit counts returned for each term in the combinations, and determines hit counts returned for the combinations. Analysis mechanism 212 then determines whether a respective combination of k terms is sensitive based on the hit count, n, for the combination, and the hit count, $q_i$, for a respective term $T_i$ in the combination, and generates a result that indicates portions of the document which contain sensitive combinations.

In some embodiments, analysis mechanism 212 determines whether a combination is sensitive by computing an occurrence ratio, r, for the combination as the ratio between a predetermined function, $f$, of the terms $T_i$, and a predetermined function, g, of the hit counts $q_i$:

$$r = \frac{f(T_1, T_2, \ldots, T_k)}{g(q_1, q_2, \ldots, q_k)}.$$

In some variations to these embodiments, analysis mechanism 212 computes $f(T_1, T_2, \ldots, T_k)$ by determining the level of presence for the terms $T_i$ in a corpus. For example, analysis mechanism 212 can determine the number of times the terms $T_i$ appear together in the corpus. In some other variations, the predetermined function $f$ of $T_i$ evaluates to a number, n, of public documents that include the respective combination of k terms:

$$f(T_1, T_2, \ldots, T_k) = n.$$

In some further variations to these embodiments, the predetermined function g of $q_i$ is the average of the individual values for $q_i$:

$$g = \frac{\sum_{i=1}^{k} q_i}{k}.$$

In some embodiments, analysis mechanism 212 can reduce the number of combinations formed for a set of terms by using NLP to form combinations for terms that are related to each other in document 214. In some variations to these embodiments, analysis mechanism 212 can reduce the number of combinations formed for a set of terms by requiring at least one term of a combination to be a proper noun.

In some embodiments, analysis mechanism 212 adopts the assumption that sensitive information is often also new information (i.e., information that has low Internet presence) that combines interesting pieces of publicly available information (i.e., information that has high Internet presence). Analysis mechanism 212 evaluates the level of Internet presence (e.g., number of hits returned for a corresponding search query) for the graph nodes, and the level of Internet presence for the combinations of nodes grouped by a number of graph edges. Combinations of graph nodes with high Internet presence and grouped by edges with low Internet presence are candidates for sensitive information. That is, nodes with a large number of Internet search hits joined by an edge with a low number of hits might indicate sensitive information.

In some embodiments, analysis mechanism 212 augments the relationship graph to better model human reasoning. For example, the system can determine the transitive closure of the relationship graph to produce a new graph where an edge between two nodes indicates that a direct or an indirect relationship exists between two nodes. Then, the system analyzes the new graph edges introduced in the process to determine the sensitivity of the combinations they form.

Natural Language Processing

In embodiments of the present invention, analysis mechanism 212 uses NLP (e.g., syntactic parsing) to detect related terms that are likely to be sensitive. Natural language processing involves detecting individual terms within a document, and then establishing the relationships between these terms. Detecting relationships between terms can involve identifying explicit relationships within a sentence, and can be as complicated as performing advanced data mining to deduce associations between words from public information. Various embodiments for detecting relationships between terms are described further in the following paragraphs.

In some embodiments, the relationships detected by an NLP operation are analyzed to measure how syntactically close the terms are to each other (i.e., the degree of separation for the relationship). For example, in the statement "the government claims that Ed works for a steel plant in Pittsburgh," the relationship between "Ed" and "steel plant" is of degree one, as is the relationship between "steel plant" and "Pittsburgh," while the relationship between "Ed" and "Pittsburgh" is of degree two. The methods for measuring a degree of separation can vary across instantiations of the system. In one embodiment, only terms determined to have a corresponding relationship are extracted from a document to determine their likelihood of being sensitive. Furthermore, combinations of terms known to have a closer relationship than other combinations have a higher priority during calculation of their likelihood of being sensitive. Therefore, analysis mechanism 212 can use the determined relationships between terms to minimize the computational complexity in performing the Internet searches by focusing on combinations of terms that have been determined to be related.

In some embodiments, analysis mechanism 212 categorizes relationships, and uses the type of a relationship as a factor when ranking the likelihood of sensitivity for a combination of terms. Categories can be relationship phrases, including "lives at," "birthday," "works for," etc. The relationship categories can be generally applicable, or can be specific to a given context. For example, when a given user is redacting a document to comply with Health Insurance Portability and Accountability Act (HIPAA) regulations, the user is likely to consider relationship phrases such as "prescribed" to be sensitive. In some variations of these embodiments, analysis mechanism 212 also gathers relationship information from document 214 without categorizing the relationships. These uncategorized relationships are concerned with identifying the related terms without recording the category type. In other words, these uncategorized relationships can be viewed as a default when the type of a relationship is not known, or can be viewed as a generalization across all of the term relationships. This generalization can be used in determining overall frequency of relationships between terms, which can affect which relationships are further analyzed to determine the level of Internet presence for the combination of terms they form. For example, "Ed" and "Mary" may appear together in several relationships, but each of these relationships may have a different category type (e.g., "met," "talked").

In some embodiments, analysis mechanism 212 detects relationships during an NLP operation by using a semantic lexicon (e.g., WordNet) to discover hypernyms. These hypernyms enable an NLP operation to detect a context-related relationship between two terms.

In some embodiments, analysis mechanism 212 uses a POS tagger during an NLP operation to identify the initial set of terms (e.g., common nouns and proper nouns). Then, analysis mechanism 212 uses a lexical functional grammar (LFG) parser and a set of ordered rewrite rules to detect syntactic relationships between terms. Syntactic relationships (e.g., grammatical functions or dependency relationships) provide more accurate evaluation of relationships than evaluating the proximity of two terms in a sentence. For example, in the sentence "the leader of the trade delegation that visited Finland met with the president," the relationship between "leader" and "president" is of degree one even though several other terms (i.e., "trade," "delegation," and "Finland") intervene between them. A system that relies solely on the sentence to determine relationships could miss a relationship between two terms that are separated by a number of words, or may dismiss the relationship after incorrectly determining that the degree of separation is less than a predetermined threshold value. In some variations to these embodiments, analysis mechanism 212 gathers information from a document using an LFG parser, without first parsing the document with a POS tagger, to determine which terms are potentially sensitive.

In some embodiments, analysis mechanism 212 uses a named-term finder to identify terms in a sentence. Named-term finders locate specific types of terms (e.g., a person, location, company name, etc.), including multiword terms (e.g. "New York," "International Business Machines," and "Dr. Mary Smith"). In some variations of these embodiments, analysis mechanism 212 builds multiword terms from the output of the syntactic parser to increase the efficiency of the parsing step. In other variations of these embodiments, analysis mechanism 212 uses named-term detection in conjunction with an LFG parser. Any syntactic parser from which dependencies can be extracted could be used for determining relationships and their degree, including but not limited to Head-driven Phrase Structure Grammar (HPSG) formalisms, Combinatory Categorial Grammar (CCG) formalisms, Tree Adjoining Grammar (TAG) formalisms, and dependency parsers. Furthermore, treebank parsers can be used to determine relationships and their degree by measuring path lengths in the resulting treebank.

In some embodiments, analysis mechanism 212 uses an optimized XLE ordered rewriting system to process XLE LFG parser output efficiently. In some variations of these embodiments, analysis mechanism 212 uses other ordered rewrite systems, or non-ordered systems, to extract related terms and to delete unused information (e.g., most syntactic parsers contain information about tense, number, etc.).

Relationship Graph

Figure 3A:
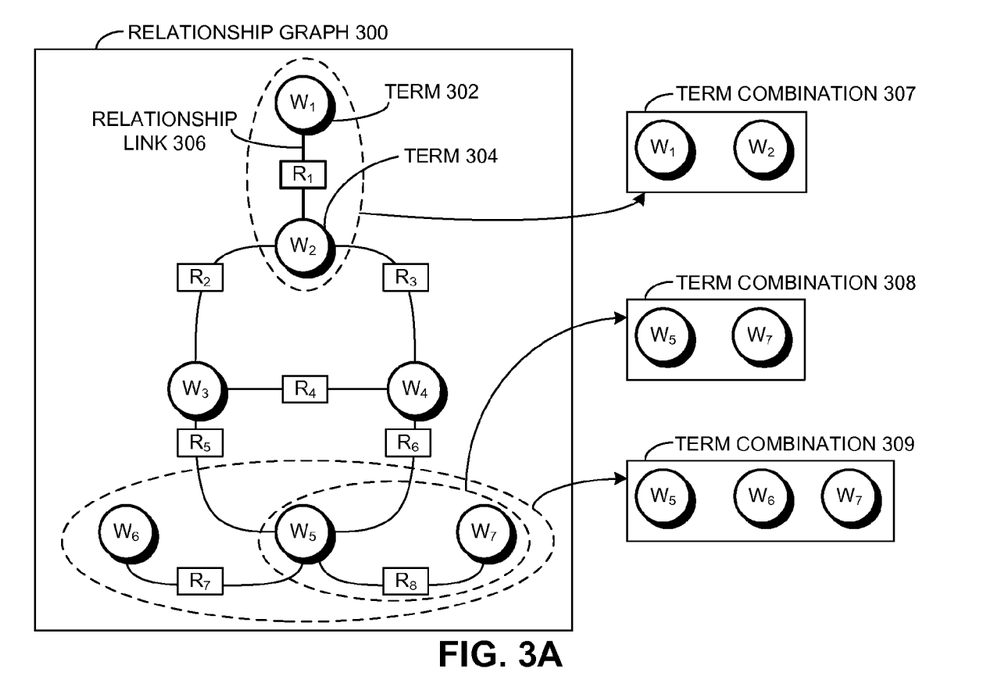
FIG. 3A illustrates a relationship graph in accordance with an embodiment of the present invention.

FIG. 3A illustrates a relationship graph 300, and a number of combinations of terms 307-309 generated from relationship graph 300, in accordance with an embodiment of the present invention. Relationship graph 300 illustrates a number of terms, such as terms 302-304, gathered from a document, and a number of relationship links, such as relationship link 306, which couple terms that are related. A term (e.g., term 302) in relationship graph 300 is identified from a document being analyzed, and is associated with a term (e.g., term $W_1$) in the document. Furthermore, a relationship link (e.g., relationship link 306) is associated with a relationship (e.g., relationship $R_1$) that is formed between two terms in the document (e.g., terms $W_1$, and $W_2$). In embodiments of the present invention, the system gathers terms from the document using a POS tagger, and forms relationship links from the relationships identified between terms using an NLP operation.

Combinations 307 and 308 illustrate examples of combinations of terms generated by the second analysis stage of the analysis mechanism. In these examples, the analysis mechanism forms term combinations 307 and 308 after determining that terms $W_1$, $W_2$, $W_5$, and $W_7$ have high Internet presence, and relationships $R_1$ and $R_8$ have low Internet presence. Furthermore, term combination 309 illustrates an example of a combination of terms generated by combining a term or a combination with an existing combination. In this example, the analysis mechanism forms term combination 309 after determining that a relationship $R_7$ couples term $W_6$ with term combination 308, determining that the term $W_6$ has high Internet presence, and determining that relationship $R_7$ (which couples term $W_6$ with term combination 308) has low Internet presence.

Distinguishing Novel Information from Sensitive Information

In some embodiments, Internet-based data mining can be leveraged to remove false positive sensitive-content identification by distinguishing sensitive information from information that is merely novel. For example, if Hillary Clinton has only recently become an avid golfer, then the above techniques might propose an association between Clinton and golf as a potentially sensitive one. In this example, the term "Hillary Clinton golf" is expected to have relatively low Internet presence, whereas each of "Hillary Clinton" and "golf" is expected to have high Internet presence.

In some embodiments, the system disregards a respective combination of terms from a document that is not associated with sensitive information by determining whether the respective combination can be inferred from public information. In other words, the system disregards a respective combination of terms that is associated with novel information, and is determined to be non-sensitive information. In the example for Hillary Clinton, the sensitive content detection system can mine the Internet to estimate the degree of separation between Hillary Clinton and golf. In these embodiments, the system mines the Internet for information pertaining to Hillary Clinton and for information pertaining to golf. The system could detect an association between Clinton and other politicians by mining the Internet for associations, or by leveraging hypernyms from a semantic lexicon, and repeat the mining operation to detect associations between other politicians and golf that have high Internet presence. These associations would indicate that, while Clinton's affinity for golf may be novel, it is unlikely to be sensitive information.

Figure 3B:
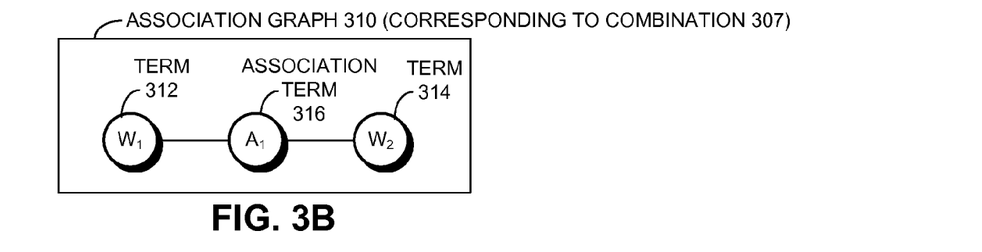
FIG. 3B illustrates an association graph corresponding to a novel relationship in accordance with an embodiment of the present invention.

FIG. 3B illustrates an association graph 310 corresponding to a novel relationship, which corresponds to term combination 307, in accordance with an embodiment of the present invention. An association graph is a graph that illustrates how a number of terms are associated to each other by coupling the number of terms (e.g., terms 312-314) with a number of association terms (e.g., association term 316) that form common-knowledge relationships between the number of terms. An association graph allows for a degree of separation to be determined between two respective terms (e.g., terms $W_1$ and $W_2$ of FIG. 3B) by determining the shortest path between the two respective terms, and counting the number of association terms that form this path. An association graph between terms $W_1$ and $W_2$ corresponds to a novel relationship when the degree of separation between the two respective terms is less than a predetermined threshold value, N. In this example, term combination 307 is found to have a degree of one, given that a single association term 316 (i.e., term $A_1$) couples terms $W_1$ and $W_2$. Therefore, if the predetermined threshold value N is set to three, then term combination 307 is found to be a novel combination, but not a sensitive one, because public knowledge can easily be used to determine that terms $W_1$ and $W_2$ are related.

Figure 3C:
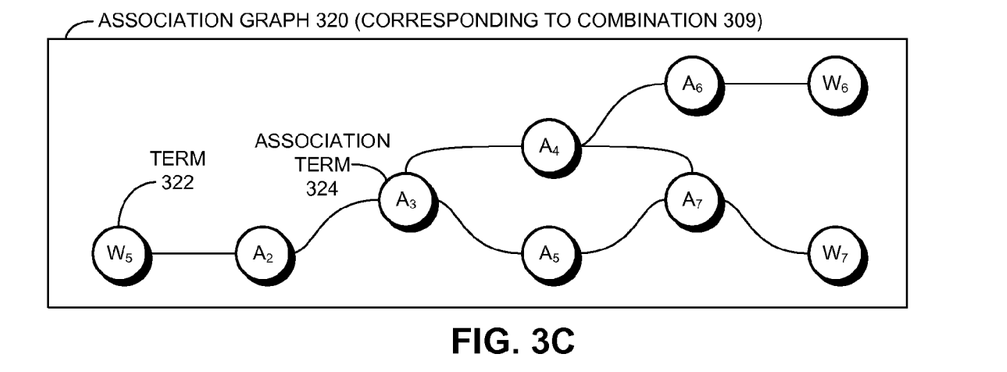
FIG. 3C illustrates an association graph corresponding to a sensitive relationship in accordance with an embodiment of the present invention.

FIG. 3C illustrates an association graph 320 corresponding to a sensitive relationship, which corresponds to term combination 309, in accordance with an embodiment of the present invention. An association graph for a number of terms (e.g., terms $W_5$, $W_6$, and $W_7$) corresponds to a sensitive relationship when the degree of separation between the terms is at least a predetermined threshold value, N. In this example, term combination 309 is found to have a degree of three, given that a shortest path comprising of three association terms (i.e., association terms $A_6$, $A_4$, and $A_7$) couples terms $W_6$ and $W_7$. Therefore, if the predetermined threshold value N is set to three, then term combination 309 is found to be a sensitive combination because public knowledge cannot be easily used to determine that terms $W_6$ and $W_7$ are related.

Figure 4:
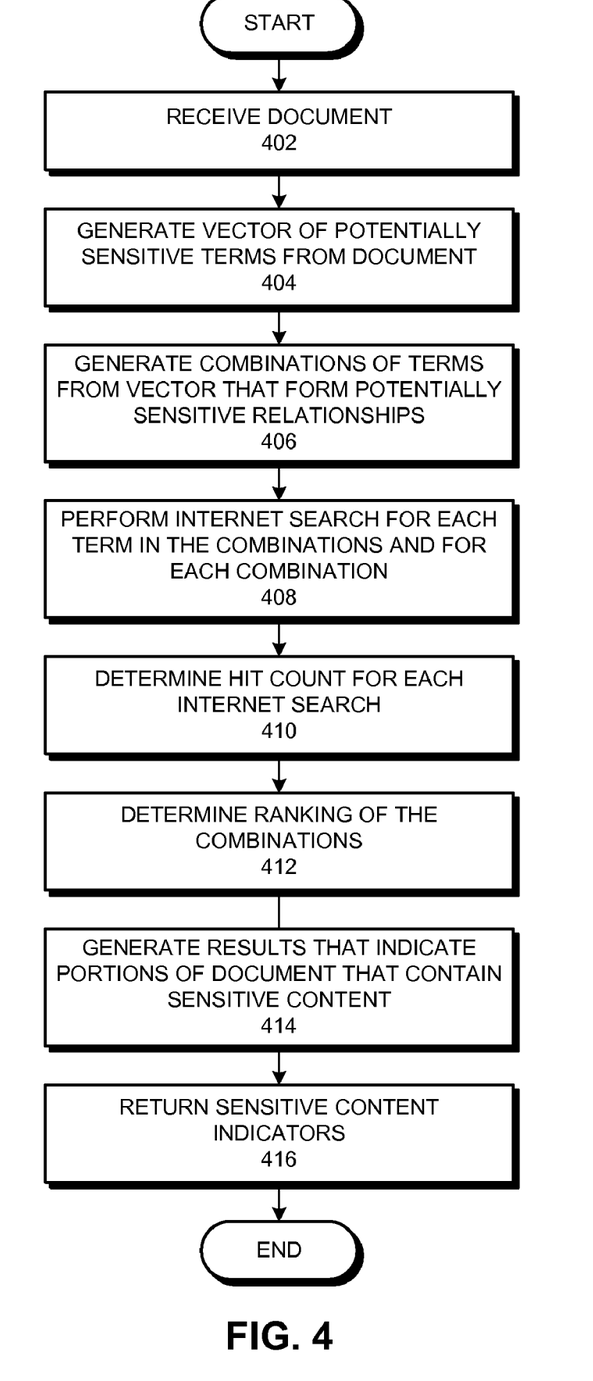
FIG. 4 presents a flowchart illustrating a process for detecting sensitive content in a document in accordance with an embodiment of the present invention.

FIG. 4 presents a flowchart illustrating a process for detecting sensitive content in a document in accordance with an embodiment of the present invention. The system first receives a document (operation 402), and generates a vector of potentially sensitive terms from the document (operation 404). Then, the system generates combinations of terms from the vector that form potentially sensitive relationships (operation 406). Next, the system performs an Internet search for each term in the combinations, and for each combination (operation 408). The system uses the search results to determine a hit count for each Internet search (operation 410). Subsequently, the system determines a ranking of the combinations based on the hit counts (operation 412), generates results that indicate portions of the document that contain sensitive content (operation 414), and returns sensitive content indicators that identify these portions of documents that contain sensitive content (operation 416).

Figure 5:
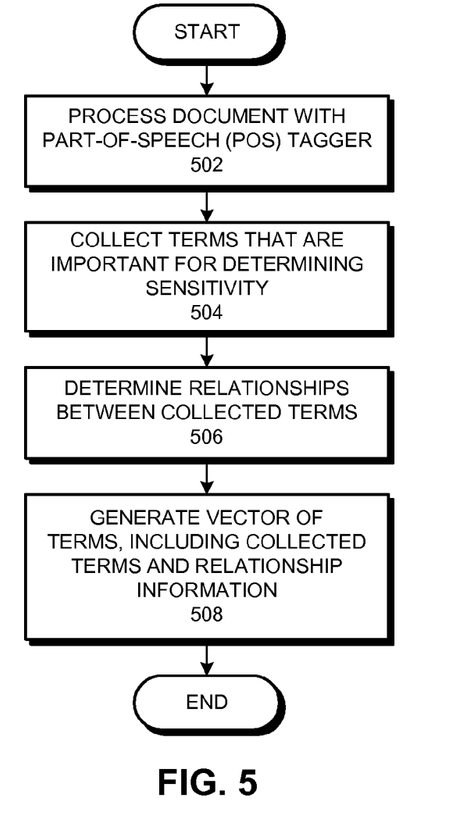
FIG. 5 presents a flowchart illustrating a process for generating a vector of terms in accordance with an embodiment of the present invention.

FIG. 5 presents a flowchart illustrating a process for generating a vector of terms in accordance with an embodiment of the present invention. The system first processes a document with a POS tagger (operation 502), and collects terms that are important for determining sensitivity (operation 504). Then, the system determines relationships between collected terms (operation 506), and generates a vector of terms and the relationship information (operation 508).

Figure 6:
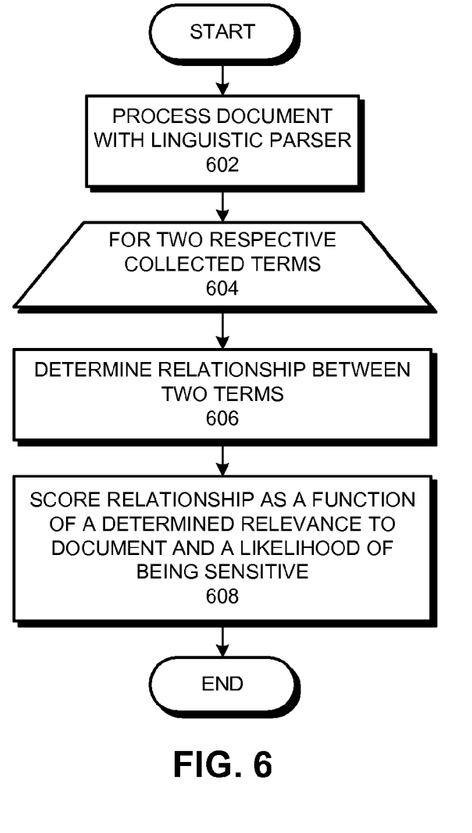
FIG. 6 presents a flowchart illustrating a process for determining relationships between terms in a document in accordance with an embodiment of the present invention.

FIG. 6 presents a flowchart illustrating a process for determining relationships between terms in a document in accordance with an embodiment of the present invention. The system first processes the document with a linguistic parser (operation 602). For two respective collected terms (operation 604), the system determines relationships between the two terms (operation 606), and scores the relationship as a function of a determined relevance to the document and a likelihood of being sensitive (operation 608).

Figure 7:
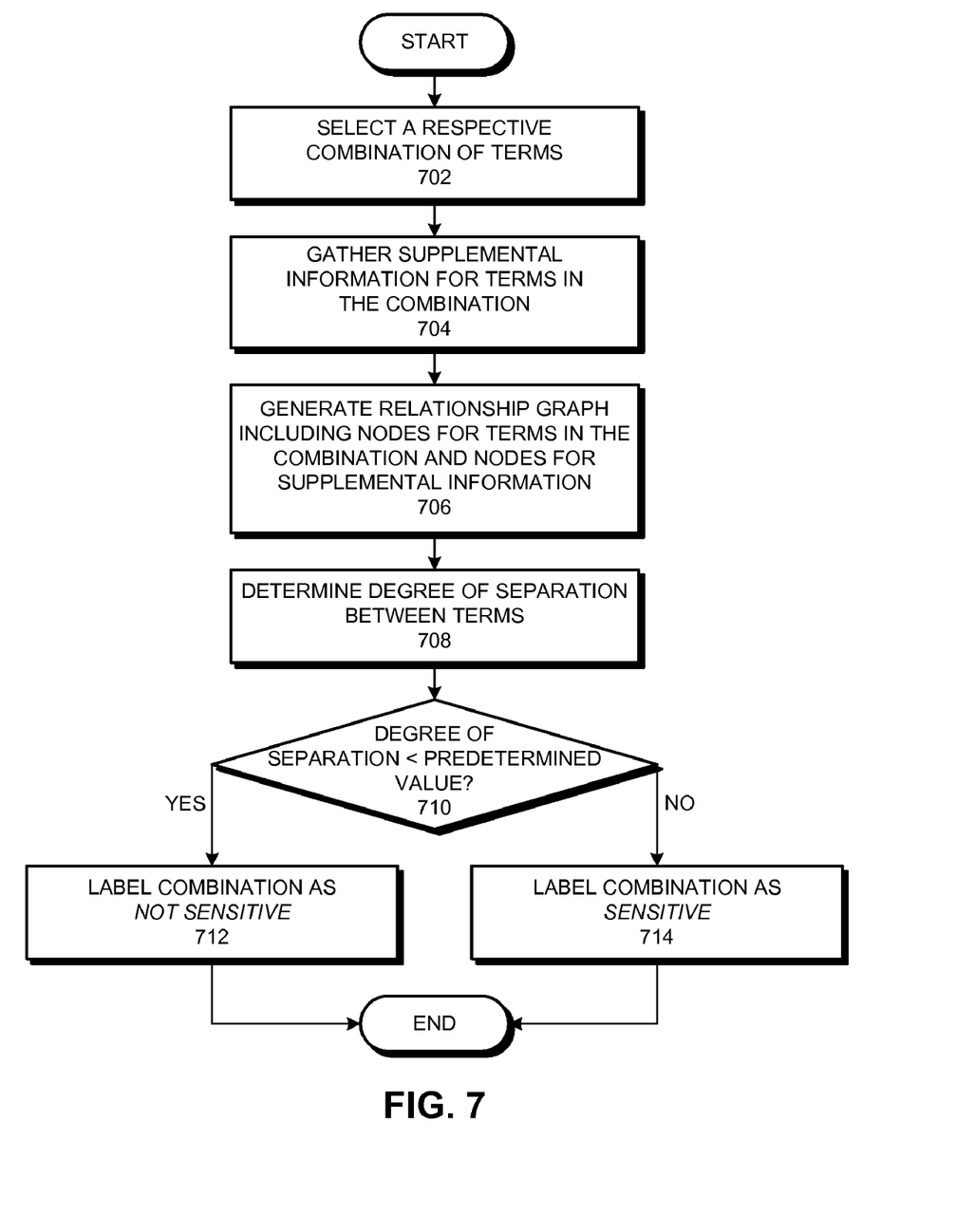
FIG. 7 presents a flowchart illustrating a process for determining whether a respective combination is associated with sensitive information in accordance with an embodiment of the present invention.

FIG. 7 presents a flowchart illustrating a process for determining whether a respective combination is associated with sensitive information in accordance with an embodiment of the present invention. The system first selects a respective combination of terms (operation 702), and gathers supplemental information for the terms in the combination (operation 704). Then, the system generates a relationship graph for the combination of terms, which includes nodes for the terms in the combination, and nodes for the supplemental information (operation 706). Next, the system uses the relationship graph to determine a degree of separation between two respective terms (operation 708). The system then determines if the degree of separation between the terms is less than a predetermined threshold value (operation 710). If so, the system labels the combination as not sensitive (operation 712). Otherwise, if the degree of separation is greater than or equal to a predetermined threshold value, the system labels the combination as sensitive (operation 714).

Computer System

Figure 8:
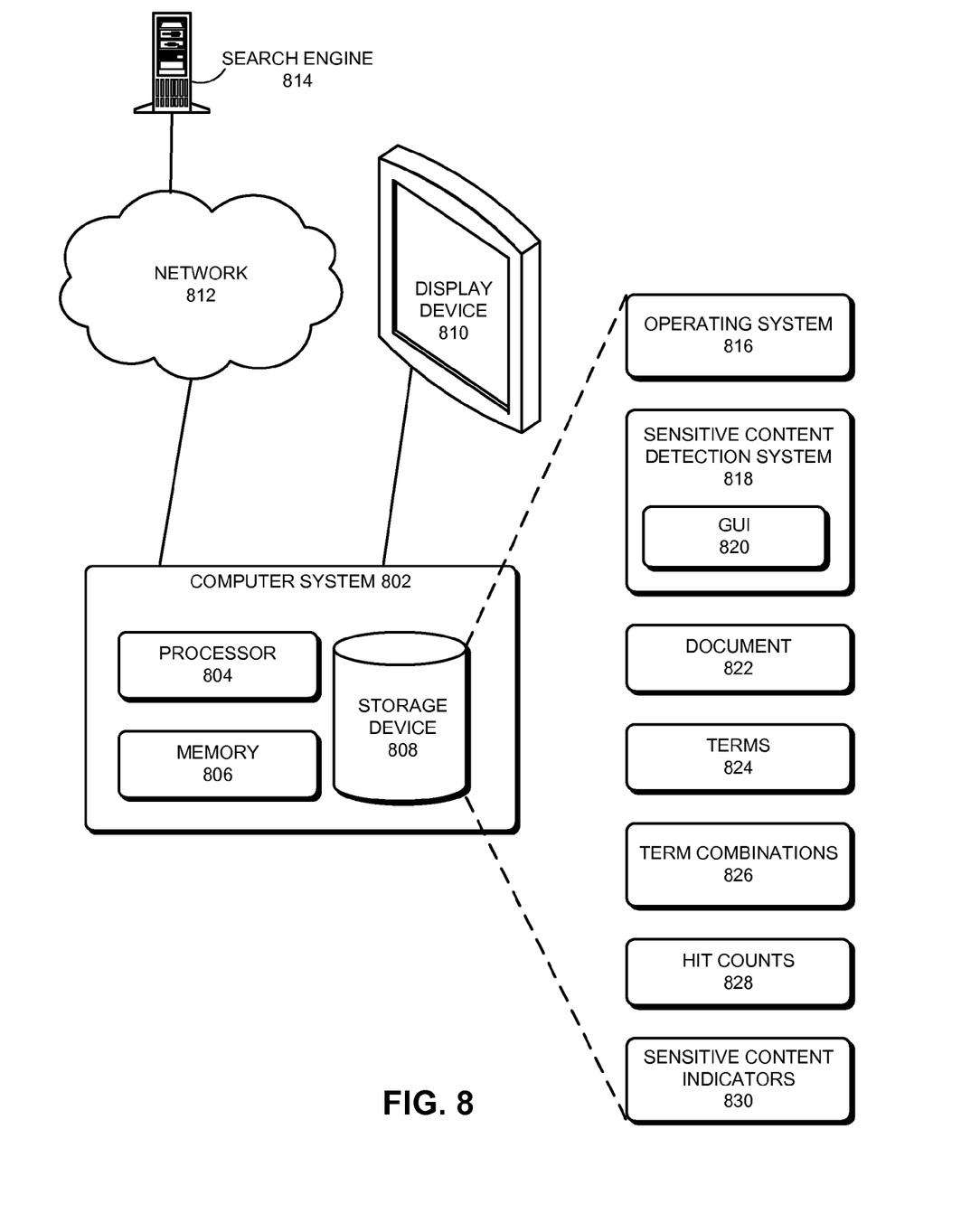
FIG. 8 illustrates an exemplary computer system that facilitates detecting sensitive content in a document in accordance with an embodiment of the present invention.

FIG. 8 illustrates an exemplary computer system 802 that facilitates detecting sensitive content in a document 822 in accordance with an embodiment of the present invention. Computer system 802 includes a processor 804, a memory 806, and a storage device 808. Furthermore, computer system 802 is coupled to a network 812 and a display device 810. Also coupled to network 812 is a search engine 814. In one embodiment, network 812 includes the Internet.

Storage device 808 stores an operating system 816, a sensitive content detection system 818, a document 822, terms 824, term combinations 826, hit counts 828, and sensitive content indicators 830. In one embodiment, sensitive content detection system 818 includes a graphical user interface (GUI) module 820.

During operation, sensitive content detection system 818 is loaded from storage device 808 into memory 806 and executed by processor 804. Sensitive content detection system 818 takes document 822 as input, and identifies a number of terms 824 from document 822. Then, sensitive content detection system 818 generates term combinations 826 by grouping terms 824 that are determined to be related in document 822. Next, sensitive content detection system 818 performs Internet searches on search engine 814 to determine hit counts 828 for terms 824, and to determine hit counts 828 for term combinations 826. Sensitive content detection system 818 then identifies sensitive portions of document 822 based on hit counts 828 for term combinations 826 normalized by hit counts 828 for terms 824, and produces sensitive content indicators 830 to indicate the sensitive portions of document 822.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-executed method for detecting sensitive content in a document, the method comprising:
    receiving a document;
    identifying a set of terms in the document;
    generating a combination of terms, based on the identified terms, that is associated with a semantic meaning and is potentially sensitive;
    performing a first search through a public corpus for the combination of terms and determining a first search hit count returned for the combination;
    performing additional searches through the public corpus for individual terms in the combination and determining search hit counts returned for each term in the combination;
    computing a search hit ratio between the first search hit count and the average search hit count for the individual terms in the combination;
    in response to the computed search hit ratio being smaller than a predetermined value, labeling the combination of terms as sensitive; and
    generating a result that indicates portions of the document which contain sensitive combinations;
    determining a relationship between the identified terms by processing the document with a syntactic parser to determine relationships between the terms;
    wherein determining the relationship between the identified terms further comprises scoring a respective relationship based on a determined relevance to the document and a likelihood of the terms being sensitive.

2. The method of claim 1, wherein identifying the set of terms in the document comprises processing the document with a part-of-speech (POS) tagger to identify words that belong to a predetermined set of word classes.

3. The method of claim 1, further comprising disregarding the combination if the combination is not associated with sensitive information by determining that the respective combination can be inferred from public information.

4. The method of claim 3, wherein determining that the combination can be inferred from public information comprises:
    for a respective term in the combination, gathering supplemental information related to the term based on the public corpus searches and/or synonym/hypernym databases;
    determining a degree of separation between two terms in the combination by determining the relationship between a first term in the combination and the supplemental information associated with a second term in the combination; and
    determining whether the degree of separation between the two terms in the combination is below a predetermined threshold.

5. A non-transitory computer-readable storage medium storing instructions that when executed by a computer cause the computer to perform a method for detecting sensitive content in a document, the method comprising:
    receiving a document;
    identifying a set of terms in the document;
    generating a combination of terms, based on the identified terms, that is associated with a semantic meaning and is potentially sensitive;
    performing a first search through a public corpus for the combination of terms and determining a first search hit count returned for the combination;
    performing additional searches through the public corpus for the individual terms in the combination and determining search hit counts returned for each term in the combination;
    computing a search hit ratio between the first search hit count and the average search hit count for the individual terms in the combination;
    in response to the computed search hit ratio being smaller than a predetermined value, labeling the combination of terms as sensitive; and
    generating a result that indicates portions of the document which contain sensitive combinations;
    determining a relationship between the identified terms by processing the document with a syntactic parser to determine relationships between the terms;
    wherein determining the relationship between the identified terms further comprises scoring a respective relationship based on a determined relevance to the document and a likelihood of the terms being sensitive.

6. The non-transitory computer-readable storage medium of claim 5, wherein identifying the set of terms in the document candidate comprises processing the document with a part-of-speech (POS) tagger to identify words that belong to a predetermined set of word classes.

7. The non-transitory computer-readable storage medium of claim 5, wherein the method further comprises disregarding the combination if the combination is not associated with sensitive information by determining that the respective combination can be inferred from public information.

8. The non-transitory computer-readable storage medium of claim 7, wherein determining that the combination can be inferred from public information comprises:
    for a respective term in the combination, gathering supplemental information related to the term based on the public corpus searches and/or synonym/hypernym databases;
    determining a degree of separation between two terms in the combination by determining the relationship between a first term in the combination and the supplemental information associated with a second term in the combination; and
    determining whether the degree of separation between the two terms in the combination is below a predetermined threshold.

9. An apparatus for detecting sensitive content in a document, comprising:
    a processor;
    a receiving mechanism configured to receive a document;
    an analysis mechanism configured to:
    identify a set of terms in the document; and
    generate a combination of terms, based on the identified terms, that is associated with a semantic meaning and is potentially sensitive; and a search engine interface configured to:
    perform a first search through a public corpus for the combination of terms and determine a first search hit counts returned for the combination; and
    perform additional searches through the public corpus for the individual terms and determine search hit counts returned for each term in the combination;
    wherein the analysis mechanism is further configured to:
    compute a search hit ratio between the first search hit count and the average search hit count for the individual terms in the combination;
    in response to the computed search hit ratio being smaller than a predetermined value, label the combination of terms as sensitive; and generate a result that indicates portions of the document which contain sensitive combinations;

determine a relationship between the identified terms by processing the document with a syntactic parser to determine relationships between the terms;

wherein while determining the relationship between the identified terms, the analysis mechanism is further configured to score a respective relationship based on a determined relevance to the document and a likelihood of being sensitive.

10. The apparatus of claim 9, wherein while identifying the set of terms in the document, the analysis mechanism is further configured to process the document with a part-of-speech (POS) tagger to identify words that belong to a predetermined set of word classes.

11. The apparatus of claim 9, wherein the analysis mechanism is further configured to disregard the combination if the combination is not associated with sensitive information by determining that the respective combination can be inferred from public information.

12. The apparatus of claim 11, wherein while determining that the combination can be inferred from public information, the analysis mechanism is configured to:

for a respective term in the combination, gather supplemental information related to the term based on the public corpus searches and/or synonym/hypernym databases;

determine a degree of separation between two terms in the combination by determining the relationship between a first term in the combination and the supplemental information associated with a second term in the combination; and determine whether the degree of separation between the two terms in the combination is below a predetermined threshold.

* * * * *